Patented Sept. 21, 1937

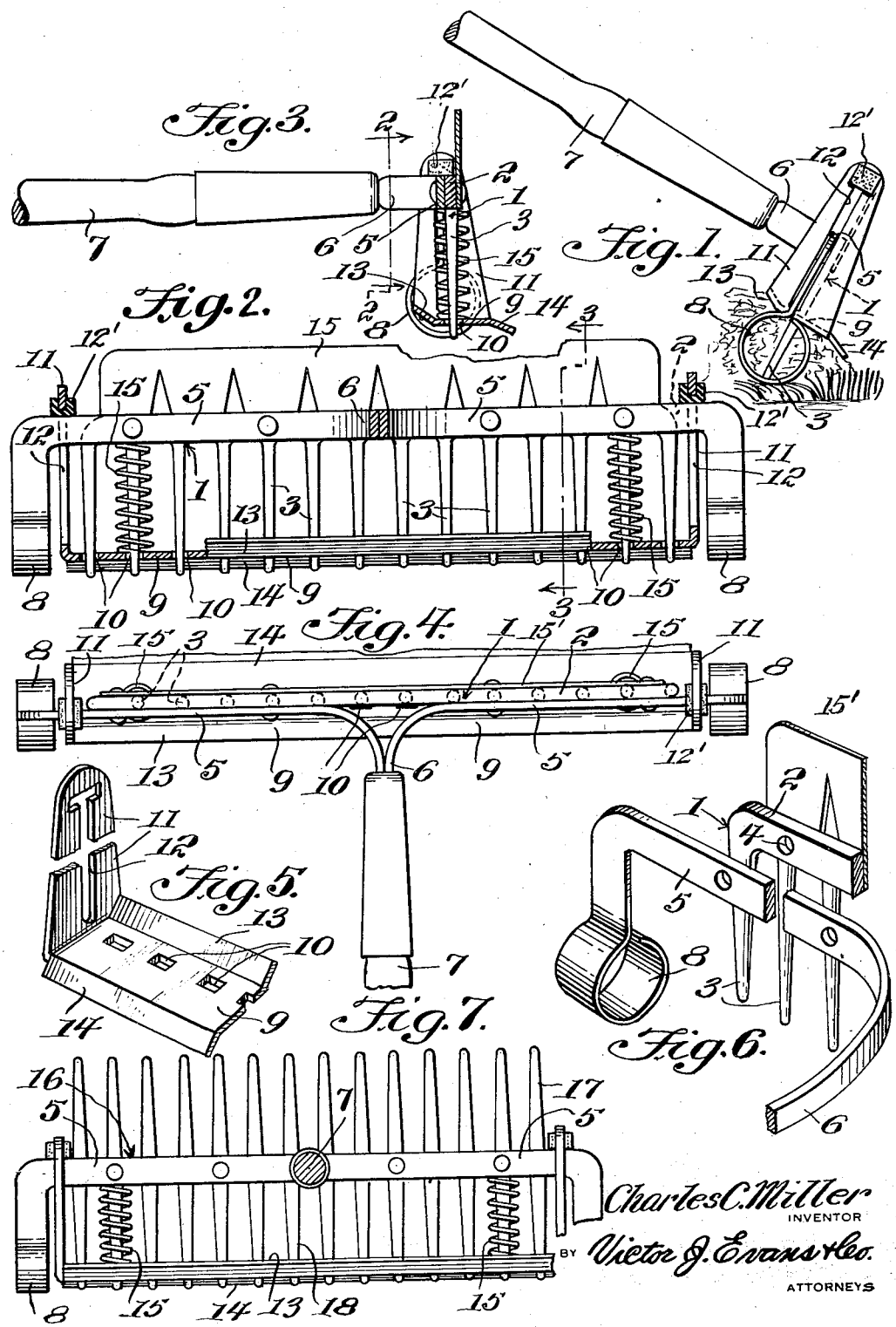

2,093,923

UNITED STATES PATENT OFFICE 2,093,923

SELF CLEANING LAWN RAKE

Charles C. Miller, Littlestown, Pa.

Application December 30, 1936, Serial No. 118,376

3 Claims. (Cl. 55—146)

This invention relates to rakes and has for the primary object the provision of a self-cleaning device of this character which may be manufactured and sold at a low cost and which will be prevented from digging into the soil when raking grass or the like and thereby eliminate undesirable pull thereon.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a fragmentary side elevation illustrating a rake constructed in accordance with my invention.

Figure 2 is a sectional view taken on the line 2—2 of Figure 3.

Figure 3 is a sectional view taken on the line 3—3 of Figure 2.

Figure 4 is a fragmentary top plan view illustrating the device.

Figure 5 is a fragmentary perspective view illustrating a portion of the cleaning element.

Figure 6 is a fragmentary perspective view illustrating one of the ground engaging elements for regulating the depth at which the teeth of the rake may enter grass or the like.

Figure 7 is a fragmentary view, partly in section, showing my invention adapted to a rake equipped with oppositely arranged teeth.

Referring in detail to the drawing, the numeral 1 indicates a rake head including a cross member 2 on which the spaced teeth 3 are formed. The cross member 2 has openings 4 to receive rivets or like fasteners for securing to the cross member bars 5. Portions of the bars 5 parallel the cross member 2 of the head and their adjacent ends are curved away from the head and brought into parallel relation to form an attaching shank 6 for securing the rake head to a handle 7. The outer or opposite ends of the members 5 are bent at right angles to parallel the teeth and terminate in tubular shaped ground engaging portions 8. The ground engaging elements 8 or the faces thereof which contact the ground are in a plane with the free ends of the teeth 3 to prevent the teeth from digging into the ground or soil when raking grass or the like, as shown in Figure 1.

A cleaning plate 9 is provided with a series of openings 10 to slidably receive the teeth 3 of the rake head and has formed on its ends attaching portions 11 provided with slots 12. The members 5 extend through the slots 12 of the attaching portions 11 and thereby slidably secure the cleaning plate on the rake head and for limiting the movement of the cleaning plate towards the free ends of the teeth 3. Cushion bumpers 12' are secured on the attaching portions 11 to engage the rake head and thereby reduce noise caused by the attaching portions coming to rest on the head. One edge of the cleaning plate is curved upwardly, as shown at 13, while the opposite edge 14 is curved downwardly. Coil springs 15 are mounted on certain teeth and are interposed between the cross member 2 and between the plates for urging the direction of the cleaning plate towards the free ends of the teeth so that each time the rake is raised or elevated the cleaning plate travels in the direction of the free ends of the teeth to force from the teeth any accumulation of grass, weeds, leaves, etc., thereby rendering the rake self-cleaning.

A guard plate 15' is secured on the rake head and extends vertically to check leaves and cut growth from passing over the head.

As shown in Figure 7, a rake head 16 may be employed and which is of the type having groups of teeth 17 and 18. The groups of teeth 17 and 18 extend in opposite directions and the group 18 has the cleaning mechanism adapted thereto so that when it is desired to have a rake minus of the cleaning mechanism and the gage means, the group of teeth 17 may be employed for raking.

Having described the invention, I claim:

1. A rake comprising a head including a cross member and a series of teeth, means for attaching the head to a handle and projecting beyond the end teeth of the group of teeth and bent angularly to form ground engaging elements terminating in a plane with the free ends of the teeth, a cleaning plate slidably mounted on the teeth, means carried by said cleaning plate and slidably connected to said first means, and coil springs mounted on certain of said teeth and bearing against the cleaning plate.

2. A rake comprising a head including a cross member and a series of teeth, means for attaching the head to a handle and projecting beyond the end teeth of the group of teeth and bent angularly to form ground engaging elements terminating in a plane with the free ends of the teeth, a cleaning plate slidably mounted on the teeth, means carried by said cleaning plate and slidably connected to said first means, coil springs mounted on certain of said teeth and bearing against the cleaning plate, said cleaning plate having one edge curved upwardly and its opposite edge curved downwardly.

3. A rake comprising a head including a cross member and a series of teeth, members secured to said cross member and having portions thereof paralleling the cross member and portions bent angularly thereto and secured to a handle and portions bent to parallel the teeth and bent to form ground engaging elements terminating in a plane with the free ends of the teeth, a cleaning plate slidably mounted on the teeth, slotted portions formed on said plate and receiving the last-named members, and springs acting on the cleaning plate to urge the latter in the direction of the free ends of the teeth.

CHARLES C. MILLER.